US008623949B2

United States Patent
Komurasaki et al.

(10) Patent No.: US 8,623,949 B2
(45) Date of Patent: Jan. 7, 2014

(54) RUBBER COMPOSITION

(75) Inventors: Hideto Komurasaki, Kanagawa (JP); Yoshifumi Kojima, Kanagawa (JP)

(73) Assignee: NOK Corporation, Tokyo (JP)

( * ) Notice: Subject to any disclaimer, the term of this patent is extended or adjusted under 35 U.S.C. 154(b) by 42 days.

(21) Appl. No.: 13/255,346

(22) PCT Filed: Mar. 2, 2010

(86) PCT No.: PCT/JP2010/053318
§ 371 (c)(1),
(2), (4) Date: Sep. 8, 2011

(87) PCT Pub. No.: WO2010/106908
PCT Pub. Date: Sep. 23, 2010

(65) Prior Publication Data
US 2011/0315486 A1      Dec. 29, 2011

(30) Foreign Application Priority Data
Mar. 16, 2009   (JP) ................................. 2009-062447

(51) Int. Cl.
*C08K 5/32*   (2006.01)
*C08K 5/18*   (2006.01)
*C08K 5/103*  (2006.01)
*C08L 27/06*  (2006.01)

(52) U.S. Cl.
USPC ............ 524/236; 524/255; 524/293; 524/297

(58) Field of Classification Search
USPC ................... 524/255, 293, 297, 464
See application file for complete search history.

(56) References Cited

U.S. PATENT DOCUMENTS 5,502,095 A * 3/1996 Ueshima et al. ............. 524/269

FOREIGN PATENT DOCUMENTS

| DE | 3535137 A1 * | 4/1987 | ............. C08L 11/00 |
|---|---|---|---|
| JP | 60-223841 | 11/1985 | |
| JP | 04-339845 | 11/1992 | |
| JP | 05-287129 | 11/1993 | |
| JP | 06-145477 | 5/1994 | |
| JP | 07-048478 | 2/1995 | |
| JP | 07-126500 | 5/1995 | |
| JP | 08-210515 | 8/1996 | |
| JP | 11-343367 | 12/1999 | |
| JP | 2000-291798 | 10/2000 | |
| JP | 2005-068405 A * | 3/2005 | |

OTHER PUBLICATIONS

International Preliminary Report on Patentability and Written Opinion from corresponding PCT application No. PCT/JP2010/053318 dated Oct. 27, 2011 (7 pgs).
International Search Report from corresponding PCT application No. PCT/JP20140/053318 dated Apr. 6, 2010, 4 pgs.

* cited by examiner

*Primary Examiner* — Ling Choi
*Assistant Examiner* — Ronald Grinsted
(74) *Attorney, Agent, or Firm* — Brinks Gilson & Lione

(57) ABSTRACT

Disclosed is a rubber composition containing 100 parts by weight of a rubber blend comprising 99-85 by weight % of chloroprene rubber and 1-15 by weight % of chlorinated polyethylene rubber, (A) 10 to 30 parts by weight of a polyether ester-based plasticizer having a molecular weight of 450 to 650, or (B) 10 to 30 parts by weight of both of a polyether ester-based plasticizer having a molecular weight of 450 to 900 and an ester-based plasticizer having a molecular weight 350 to 500, and 3 to 10 parts by weight of two or more aromatic amine-based antioxidants. The rubber composition can simultaneously satisfy requirements for use as, for example, an automobile grease cup material, that is, heat resistance, ozone resistance, cold resistance, and adhesion to metal or resin.

19 Claims, No Drawings

RUBBER COMPOSITION

RELATED APPLICATION

This application is a 35 U.S.C. §371 national phase filing of International Patent Application No. PCT/JP2010/053318, filed Mar. 2, 2010, through which and to which priority is claimed under 35 U.S.C. §119 to Japanese Patent Application No. 2009-062447, filed Mar. 16, 2009.

TECHNICAL FIELD

The present invention relates to a rubber composition. More particularly, the present invention relates to a rubber composition that can be suitably used as, for example, a molding material for automobile grease cups.

BACKGROUND ART

Generally, vulcanized rubber has excellent elasticity in a wide strain range that is not observed in other substances. Therefore, vulcanized rubber is widely used in grease cups, such as automobile dust covers, dust boots, and bellows, in which grease is encapsulated and sealed to prevent entry of dust. Of these, grease cups bonded to supporting bodies made of metal, resin, or the like are required to have excellent adhesion to the supporting bodies. Additionally, with the trends of recent higher-performance engines and smaller-size cars, vulcanized rubber used therein is required to meet rigorous requirements for heat resistance, cold resistance, ozone resistance, and other properties. For example, it is becoming difficult for the rubber compositions disclosed in Patent Documents 1 to 3, described later, to meet these requirements while maintaining satisfactory adhesion to supporting bodies.

PRIOR ART DOCUMENT

Patent Document

Patent Document 1: JP-A-60-223841
Patent Document 2: JP-A-11-343367
Patent Document 3: JP-A-2000-291798

OUTLINE OF THE INVENTION

Problem to be Solved by the Invention

An object of the present invention is to provide a rubber composition that can simultaneously satisfy requirements for use as, for example, an automobile grease cup material, that is, heat resistance, ozone resistance, cold resistance, and adhesion to metal or resin.

Means for Solving the Problem

The above object of the present invention can be accomplished by a rubber composition containing 100 parts by weight of a rubber blend comprising 99-85 by weight % of chloroprene rubber and 1-15 by weight % of chlorinated polyethylene rubber, (A) 10 to 30 parts by weight of a polyether ester-based plasticizer having a molecular weight of 450 to 650 or (B) 10 to 30 parts by weight of both of a polyether ester-based plasticizer having a molecular weight of 450 to 900 and an ester-based plasticizer having a molecular weight 350 to 500 other than polyether ester-based plasticizers, and 3 to 10 parts by weight of two or more aromatic amine-based antioxidants.

Effect of the Invention

Vulcanization molding products obtained from the rubber composition of the present invention have excellent heat resistance, ozone resistance, cold resistance, and adhesion to metal or resin. Due to their excellent properties, they can be effectively used in grease cups, such as, automobile dust covers. Consequently, such dust covers can achieve stable heat resistance and adhesion between rubber and supporting body, while maintaining cold resistance.

A grease cup as used in the present invention has functions of preventing leakage of lubricant filled in the inside as well as preventing entry of muddy water, refuse, waste, etc., from the outside. For example, dust covers, dust boots, bellows, and the like are exemplified. These are mainly used at the joint part of a power transmission device, and widely used as components for automobiles, machines, etc.

EMBODIMENTS FOR CARRYING OUT THE INVENTION

Chloroprene rubber is obtained by emulsion polymerization of 2-chloro-1,3-butadiene. Generally, polymerization adjusters are used to achieve uniformity of the molecular weight distribution and stability during polymerization. Such adjusters are classified as a sulfur-modified type using sulfur, thiuram disulfide, etc. or a non-sulfur-modified type using mercaptan etc., either of which can be used in the present invention. Practically, commercial products available from Denki Kagaku Kogyo K.K., such as DR31 (non-sulfur-modified type) and DORDM40 (sulfur-modified type), can be used as they are.

Chlorinated polyethylene rubber is obtained by chlorination of polyethylene powder or particles in an aqueous suspension, or by chlorination of polyethylene dissolved in an organic solvent. Preferably, chlorinated polyethylene rubber obtained by chlorination of polyethylene powder or particles in an aqueous suspension is used. Chlorinated polyethylene rubber is generally amorphous or crystalline chlorinated polyethylene having a chlorine content of 5 to 50 wt. %. In the present invention, amorphous (non-crystalline) chlorinated polyethylene having a chlorine content of 5 to 50 wt. %, preferably 25 to 45 wt. %, is used. As the chlorinated polyethylene rubber, commercial products available from Tosoh Corporation, such as CN5020 (chlorine content: 40 wt. %) and CN1800 (chlorine content: 10 wt. %), can be used as they are.

The proportion of chloroprene rubber and chlorinated polyethylene rubber ranges from about 99:1 to 85:15 by wt. %, preferably about 97:3 to 90:10 by wt. %. When the proportion of chlorinated polyethylene rubber is less than this range, heat resistance and adhesion to supporting bodies are deteriorated; whereas when the proportion is greater than this range, cold resistance decreases.

To a rubber blend containing chloroprene rubber and chlorinated polyethylene rubber at the above ratio, (A) a polyether ester-based plasticizer or (B) both of a polyether ester-based plasticizer and an ester-based plasticizer is added in an amount of 10 to 30 parts by weight, preferably 15 to 30 parts by weight, based on 100 parts by weight of the rubber blend. When the proportion of plasticizer(s) is less than this range, cold resistance decreases; whereas when the proportion is greater than this range, adhesion to metal etc. is deteriorated.

In an embodiment (A), a polyether ester-based plasticizer having a molecular weight of 450 to 650, preferably 500 to 600, is singly used. Practically, commercial products available from Adeka Corporation, such as RS-700, can be used.

The use of a polyether ester-based plasticizer having a molecular weight less than this range leads to a decrease in heat resistance; whereas the use of a polyether ester-based plasticizer having a molecular weight greater than this range leads to a decrease in cold resistance.

In contrast, in an embodiment (B), a polyether ester-based plasticizer having a molecular weight of 450 to 900, preferably 500 to 900, is used in combination with an ester-based plasticizer, other than polyether ester-based plasticizers, having a molecular weight of 350 to 500, preferably 400 to 500. Examples of such ester-based plasticizers include dioctyl sebacate and other sebacate-based esters; diisodecyl adipate, dibutylglycol adipate, dibutylcarbitol adipate, and other adipate-based esters; dioctyl azelate and other azelate-based esters; and dioctyl phthalate and other phthalate-based esters.

In the embodiment (B), in the total amount of plasticizers, a polyether ester-based plasticizer is used at a ratio of 35 wt. % or more, with respect to 65 wt. % or less of a ester-based plasticizer other than polyether ester-based plasticizers; a preferred proportion of the polyether ester-based plasticizer to the ester-based plasticizer ranges from 50:50 to 75:25 by wt %. In this case, among polyether ester-based plasticizers having a molecular weight of 450 to 900, preferably 500 to 900, a plasticizer having a molecular weight of 450 to 650 is also used in the embodiment (A); therefore, a polyether ester-based plasticizer having a molecular weight of 450 to 650 can be singly used in accordance with the embodiment (A), or can be used in combination with an ester-based plasticizer other than polyether ester-based plasticizers in accordance with the embodiment (B). As polyether ester-based plasticizers having a molecular weight of 650 to 900, commercial products available from Adeka Corporation, such as RS-735, can be practically used.

The rubber blend further contains two more or more aromatic amine-based antioxidants in a total amount of 3 to 10 parts by weight, preferably 4 to 8 parts by weight, based on 100 parts by weight of the rubber blend. Amounts of antioxidants outside this range are not preferred, because an amount of antioxidants less than this range is hard to impart heat resistance and ozone resistance, whereas an amount of antioxidants greater than this range causes problems such as influence on moldability by vulcanization inhibition or blooming on the surface of the vulcanizate.

Examples of aromatic amine-based antioxidants include N-phenyl-1-naphthylamine, alkylated diphenylamine, octylated diphenylamine, 4,4'-bis($\alpha,\alpha$-dimethylbenzyl)diphenylamine, p-(p-toluenesulfonylamido)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and other aromatic amine compounds. Among these, at least two or more antioxidants are used in combination. Preferably, an aromatic amine compound comprising N-phenyl-N'-(1,3-dimethylbutyl)-p-phenylenediamine as one component, specifically a combination of this compound with 4,4'-bis($\alpha,\alpha$-dimethylbenzyl)diphenylamine, is used. The proportion of the former compound to the latter compound preferably ranges from 30:70 to 60:40 by wt. %. Here, the use of only one kind of aromatic amine-based antioxidant is difficult to achieve satisfactory both of heat resistance and cold resistance.

A rubber composition comprising these essential components may further contain fillers, vulcanizing agents, vulcanization accelerators, and antioxidants. The rubber composition may also contain stabilizers, tackifiers, mold-release agents, pigments, flame retardants, lubricants, etc, as long as rubber physical properties and desired adhesion properties are not impaired.

Examples of fillers include carbon black, clay, diatomaceous earth, talc, barium sulfate, calcium carbonate, magnesium carbonate, metal oxide, mica, graphite, aluminum hydroxide, and the like. In addition, powdery solid fillers, such as various metal powders, glass powders, ceramic powders, and granular or powdery polymers, can also be used, as long as the desired properties are not impaired.

As vulcanizing agents, zinc oxide, magnesium oxide, trilead tetraoxide, lead (II) oxide (litharge), sulfur, sulfur-containing compounds, organic peroxide, etc., can be used, depending on the type of chloroprene rubber used. Examples of sulfur-containing compounds, preferably organic sulfur-containing compounds, include thiourea-based vulcanizing agents, mercaptotriazine-based vulcanizing agents, selenium dimethyldithiocarbamate, and the like. Examples of organic peroxides include dicumyl peroxide, di-tert-butyl peroxide, 2,5-dimethyl-2,5-di(tert-butylperoxy)hexane, benzoyl peroxide, cumyl peroxide, 1,3-di(tert-butylperoxy)isopropylbenzene, 2,5-dimethyl-2,5-di(tert-butylperoxy)hexine-3, m-tolyl peroxide, dipropionyl peroxide, and the like. Such a vulcanizing agent is used in an amount of about 1 to 20 parts by weight, preferably about 2 to 15 parts by weight, based on 100 parts by weight of rubber. Moreover, examples of vulcanization accelerators include tetramethylthiuram monosulfide, tetramethylthiuram disulfide, dibenzothiazyl disulfide, trimethylthiourea, nickel dibutyldithiocarbamate, and the like.

The preparation of rubber compositions using the above-described components can be easily carried out as follows. The components other than vulcanizing agents and vulcanization accelerators are kneaded using a heat kneader, such as a single-screw extruder, a twin-screw extruder, a roll, a Banbury mixer, a Brabender, a kneader, a high-shear mixer, or the like; then, the vulcanizing agents, vulcanization accelerators, etc., are added, followed by heat-melt kneading. Kneading can be performed in such a manner that the polymer and plasticizers are previously kneaded, and the kneaded product is mixed with fillers and other components. When kneading is performed in this procedure, shear energy generated by slipping and contamination due to the addition of plasticizers is less likely to be applied to the kneaded product; consequently, kneading does not take a long time.

Vulcanization molding can be carried out by a known method; for example, it can generally be carried out by heating at about 150 to 200° C. for about 3 to 60 minutes using an injection molding machine, a compression molding machine, a vulcanization press, or the like, optionally followed by secondary vulcanization in which heating is carried out at about 150 to 250° C. for about 1 to 24 hours, thereby forming grease cups, etc. Grease cup molded products may be formed from the rubber composition of the present invention alone or from a combination of the rubber composition with reinforcement materials, such as metal and plastic.

Supporting bodies to be integrally molded with rubber vulcanizates are made of metal or resin. Preferred examples of metal materials include carbon steel specified in JIS G4051 (Carbon steel for machine structural use) corresponding to ISO 683-1:1987 and ISO 683/11:1987; aluminum and aluminum alloy specified in JIS H4000 corresponding to ISO 209-1:1989 and ISO 209-2:1989; stainless steel materials specified in JIS G4303, 4304, and 4305 corresponding to ISO 9444: 2002, ISO 9445:2002, etc.; copper and copper alloy specified in JIS H3100; and the like. Moreover, examples of resin materials include epoxy resin, polyester resin, phenol resin, polyamide resin, polyurethane resin, polycarbonate resin, polystyrene resin, polyvinyl chloride resin, polyethylene resin, polypropylene resin, polyacetal resin, fluororesin, and the like. Rubber vulcanizates are bonded to such supporting bodies for use.

As adhesives for integrally bonding rubber vulcanizates and supporting bodies, thermoplastic resin-based adhesives, thermosetting resin-based adhesives, and elastomeric-based adhesives are preferably used. Examples of thermoplastic resin-based adhesives include vinyl acetate-based adhesives, vinyl chloride-based adhesives, polyvinyl alcohol-based adhesives, polyvinyl acetal-based adhesives, acrylic-based adhesives, polyamide-based adhesives, polyolefin-based adhesives, and the like. Examples of thermosetting resin-based adhesives include urea-based adhesives, melamine-based adhesives, phenolic-based adhesives, resorcinol-based adhesives, epoxy-based adhesives, polyurethane-based adhesives, polyester-based adhesives, and the like. Examples of elastomeric-based adhesives include chloroprene rubber-based adhesives, nitrile rubber-based adhesives, butyl rubber-based adhesives, polysulfide-based adhesives, silicone rubber-based adhesives, and the like. Adhesives comprising them as base compounds can be used.

EXAMPLES

The following describes the present invention with reference to Examples.

Example 1

| | |
|---|---|
| Chloroprene rubber (DCR31, manufactured by Denki Kagaku Kogyo K.K.; non-sulfur-modified type) | 95 pts. wt. |
| Chlorinated polyethylene rubber (CN5020, manufactured by Tosoh Corporation; Cl content: 40 wt. %) | 5 pts. wt. |
| FEF carbon black (Seast SO, manufactured by Tokai Carbon Co., Ltd.) | 35 pts. wt. |
| Stearic acid (Lunac S-30, manufactured by Kao Corporation) | 1 pts. wt. |
| Polyether ester-based plasticizer (RS-700, manufactured by Adeka Corporation; molecular weight: about 550) | 20 pts. wt. |
| Amine-based antioxidant; N-phenyl-N'-(1,3-dimethylbutyl)-p-phenylenediamine (Nocrac 6C, manufactured by Ouchi Shinko Chemical Industrial Co., Ltd.) | 3 pts. wt. |
| Amine-based antioxidant; 4,4'-bis($\alpha,\alpha$-dimethylbenzyl)-diphenylamine (Nocrac CD, manufactured by Ouchi Shinko Chemical Industrial Co., Ltd.) | 3 pts. wt. |
| Zinc oxide (Zinc white #3, manufactured by Seido Kagaku Kogyo K.K.) | 5 pts. wt. |
| Magnesium oxide (Kyowamag #150, manufactured by Kyowa Chemical Industry Co., Ltd.) | 4 pts. wt. |
| 2-Mercaptoimidazoline (Vulkacit NPV/C, manufactured by Bayer) | 1 pts. wt. |
| Tetramethylthiuram disulfide (Nocceler TT; manufactured by Ouchi Shinko Chemical Industrial Co., Ltd.) | 1 pts. wt. |

Among the above components, those other than vulcanizing agents and vulcanization accelerators were kneaded by a 3 L kneader. Thereafter, the vulcanizing agents and vulcanization accelerators were added thereto in an open roll to prepare a rubber sheet. The rubber sheet was subjected to press vulcanization (primary vulcanization) at 180° C. at 10 MPa for 5 minutes, thereby forming a slab sheet (150×150×2 mm).

The resulting molded sheet was measured and evaluated for the following items. In the adhesion test, test pieces were prepared in accordance with JIS K6256-2 corresponding to ISO 813:1997.

Hardness: According to JIS K6253:1997 corresponding to ISO 7619-1:2004 and ISO 7619-2:2004, the hardness of three laminated test sheets each having a thickness of 2 mm was measured Heat resistance: According to JIS K6257 corresponding to ISO 188:1998, hardness changes (points) after oven vulcanization at 120° C. for 70 hours were measured, and the results were evaluated according to the following criteria: 0 to +10: ○, +11 to +15: Δ, and +16 or more: X Cold resistance: According to JIS K6261 corresponding to ISO 2921:1997, TR-10 values were measured, and the results were evaluated according to the following criteria: −40° C. or less: ○, −39 to −30° C.: Δ, and −29° C. or more: X Adhesion properties: To an SPCC steel plate, a phenolic resin-based adhesive (Chemlok 205, manufactured by LORD Far East, Inc.), which was used as an undercoating material, and a polyolefin resin-based adhesive (Chemlok 6108, manufactured by LORD Far East, Inc.), which was used as a topcoating material, were applied as 50% toluene solutions, followed by air-drying. A rubber composition was vulcanization-bonded to the steel plate by thermal pressurization at 180° C., at 10 MPa for 5 minutes to prepare a test piece according to JIS K6256-2. Then, the test piece was subjected to a peeling test. Further, the remaining rubber was peeled by pincer, and the rubber remaining rate was calculated and evaluated according to the following criteria: the rubber remaining rate was 80 to 100%: ○, 60 to 79%: Δ, and 59% or less: X.

Ozone resistance: According to JIS K6259 corresponding to ISO 1431-2:1994 and ISO 1431-3:2000, the dynamic ozone test was conducted under the following conditions: ozone concentration: 50±5 pphm, temperature: 40° C., elongation rate: 0 to 20%, elongation frequency: 0.5 Hz, and test time: 250 hours, and the results were evaluated as follows: the rank based on the number and size of cracks in the test piece was higher than C2: ○, and lower than C2: X Examples 2 to 4 and Comparative Examples 1 to 3

In Example 1, the amounts of the chloroprene rubber and chlorinated polyethylene rubber were changed. In Example 4 and Comparative Example 3, CN1800 (manufactured by Tosoh Corporation; chlorine content: 10 wt. %) was used as chlorinated polyethylene rubber (chlorination PE).

Table 1 below shows the results of measurement and evaluation in Examples 1 to 4 and Comparative Examples 1 to 3, together with the amounts of chloroprene rubber and chlorinated polyethylene rubber (unit: parts by weight).

TABLE 1

|  | Comp. Ex. 1 | Ex. 1 | Ex. 2 | Ex. 3 | Comp. Ex. 2 | Ex. 4 | Comp. Ex. 3 |
|---|---|---|---|---|---|---|---|
| [Compounding component] | | | | | | | |
| Chloroprene rubber | 100 | 95 | 90 | 85 | 70 | 90 | 70 |
| Chlorinated PE (Cl content: 40%) | — | 5 | 10 | 15 | 30 | — | — |
| Chlorinated PE (Cl content: 10%) | — | — | — | — | — | 10 | 30 |
| [Measurement • evaluation results] | | | | | | | |
| Hardness (Durometer A; instant) | 52 | 52 | 52 | 51 | 50 | 50 | 50 |
| Heat resistance | ○ | ○ | ○ | ○ | ○ | ○ | ○ |
| Cold resistance | ○ | ○ | ○ | Δ | X | ○ | X |
| Adhesion properties | X | ○ | ○ | ○ | ○ | ○ | ○ |
| Ozone resistance | ○ | ○ | ○ | ○ | ○ | ○ | ○ |

Comparative Examples 4 to 7

In Example 1, the kind and amount of polyether ester-based plasticizer were changed, as shown in Table 2.
  Polyether ester-based plasticizer A: RS-700, manufactured by Adeka Corporation; molecular weight: about 550
  Polyether ester-based plasticizer B: RS-107, manufactured by Adeka Corporation; bis(butoxyethoxyethyl)adipate (molecular weight: 434)
  Polyether ester-based plasticizer C: RS-735, manufactured by Adeka Corporation; molecular weight: about 850

Comparative Example 8

In Example 1, diisodecyl adipate (DIDA, manufactured by New Japan Chemical Co., Ltd.; molecular weight: 426) was used in place of the polyether ester-based plasticizer in the same amount.
Table 2 below shows the results of measurement and evaluation in Comparative Examples 4 to 8, together with the amounts of the plasticizers (unit: parts by weight). Table 2 also shows the results of Example 1.

TABLE 2

|  | Comp. Ex. 4 | Ex. 1 | Comp. Ex. 5 | Comp. Ex. 6 | Comp. Ex. 7 | Comp. Ex. 8 |
|---|---|---|---|---|---|---|
| [Compounding component] | | | | | | |
| Polyether ester plasticizer A | 5 | 20 | 35 | | | |
| Polyether ester plasticizer B | | | | 20 | | |
| Polyether ester plasticizer C | | | | | 20 | |
| Diisodecyl adipate | | | | | | 20 |
| [Measurement • evaluation results] | | | | | | |
| Hardness (Durometer A; instant) | 56 | 52 | 44 | 52 | 53 | 51 |
| Heat resistance | ○ | ○ | ○ | X | ○ | X |
| Cold resistance | X | ○ | ○ | ○ | X | ○ |
| Adhesion properties | ○ | ○ | X | ○ | ○ | ○ |

Example 5 and Comparative Examples 9 to 15

In Example 1, the amounts of the two aromatic amine-based antioxidants (Nocrac 6C and Nocrac CD) (unit: parts by weight) were changed, as shown in Table 3.

Table 3 below shows the results of measurement and evaluation in these Example and Comparative Examples. Table 3 also shows the results of Example 1.

TABLE 3

|  | Ex. 1 | Ex. 5 | Comp. 9 | Comp. 10 | Comp. 11 | Comp. 12 | Comp. 13 | Comp. 14 | Comp. 15 |
|---|---|---|---|---|---|---|---|---|---|
| [Compounding component] | | | | | | | | | |
| Nocrac 6C | 3 | 2 | 6 | — | 2 | 12 | — | — | 6 |
| Nocrac CD | 3 | 4 | — | 6 | — | — | 2 | 12 | 6 |
| [Measurement • evaluation results] | | | | | | | | | |
| Hardness (Durometer A; instant) | 52 | 51 | 51 | 51 | 52 | 50 | 53 | 45 | 48 |
| Heat resistance | ○ | ○ | X | ○ | X | X | X | ○ | ○ |
| Cold resistance | ○ | ○ | ○ | X | ○ | Δ | ○ | X | X |
| Adhesion properties | ○ | ○ | ○ | Δ | ○ | Δ | ○ | X | X |

Examples 6 to 9 and Comparative Examples 16 to 20

In Example 1, the polyether ester-based plasticizers A to C (see the description in Comparative Examples 4 to 7) and diisodecyl adipate (DIDA; molecular weight: 426) or dioctyl sebacate (DOS, manufactured by New Japan Chemical Co., Ltd.; molecular weight: 426) were used in combination as plasticizers.
Table 4 below shows the results of measurement and evaluation in these Examples and Comparative Examples, together with the amounts of the plasticizers (unit: parts by weight).

TABLE 4

|  | Ex. 6 | Ex. 7 | Ex. 8 | Ex. 9 | Comp. 16 | Comp. 17 | Comp. 18 | Comp. 19 | Comp. 20 |
|---|---|---|---|---|---|---|---|---|---|
| [Compounding component] | | | | | | | | | |
| Polyether ester plasticizer A | 10 | 15 | 15 | — | — | 4 | 4 | — | — |
| Polyether ester plasticizer B | — | — | — | — | — | — | — | — | 10 |
| Polyether ester plasticizer C | — | — | — | 10 | 15 | — | — | 4 | — |
| Diisodecyl adipate | 10 | 5 | — | — | 20 | 16 | — | — | — |
| Dioctyl sebacate | — | — | 5 | 10 | — | — | 16 | 16 | 10 |
| [Measurement • evaluation results] | | | | | | | | | |
| Hardness (Durometer A; instant) | 51 | 52 | 51 | 52 | 45 | 52 | 53 | 56 | 51 |
| Heat resistance | ○ | ○ | ○ | ○ | X | X | X | X | X |
| Cold resistance | ○ | ○ | ○ | ○ | ○ | ○ | ○ | ○ | ○ |
| Adhesion properties | ○ | ○ | ○ | ○ | X | ○ | ○ | ○ | ○ |
| Ozone resistance | ○ | ○ | ○ | ○ | ○ | ○ | ○ | ○ | ○ |

The invention claimed is:
1. A rubber composition containing 100 parts by weight of a rubber blend comprising 99-85 by weight % of chloroprene rubber and 3-10 by weight % of chlorinated polyethylene rubber, 10 to 30 parts by weight of a polyether ester-based plasticizer having a molecular weight of 450 to 650, and 3 to 10 parts by weight of two or more aromatic amine-based antioxidants.
2. The rubber composition according to claim 1, wherein the chlorinated polyethylene rubber is amorphous chlorinated polyethylene having a chlorine content of 5 to 50 by weight %.
3. A rubber composition containing 100 parts by weight of a rubber blend comprising 99-85 by weight % of chloroprene rubber and 1-15 by weight % of chlorinated polyethylene rubber, 10 to 30 parts by weight of both of a polyether ester-based plasticizer having a molecular weight of 450 to 900 and an ester-based plasticizer having a molecular weight of 350 to 500 other than polyether ester-based plasticizer and 3 to 10 parts by weight of two or more aromatic amine-based antioxidants.

4. The rubber composition according to claim 3, wherein the chlorinated polyethylene rubber is amorphous chlorinated polyethylene having a chlorine content of 5 to 50 by weight %.

5. The rubber composition according to claim 3, wherein, in the total amount of the plasticizers, the amount of the polyether ester-based plasticizer is 35 by weight % or more, and the amount of the ester-based plasticizer other that polyether ester-based plasticizers is 65 by weight % or less.

6. The rubber composition according to claim 1, wherein the aromatic amine-based antioxidants are a combination of N-phenyl-N'-(1,3,-dimethylbutyl)-p-phenylenediamine and another aromatic amine.

7. The rubber composition according to claim 6, wherein the aromatic amine antioxidants are a combination of N-phenyl-N'-(1,3-dimethylbutyl)-p-phenylenediamine and 4,4'-bis($\alpha,\alpha$-dimethylbenzyl)diphenylamine.

8. The rubber composition according to claim 7, wherein 30-60 by weight % of the N-phenyl-N'-(1,3-dimethylbutyl)-p-phenylenediamine and 70-40 by weight % of the 4,4'-bis($\alpha,\alpha$-dimethylbenzyl)diphenylamine are used in 100 by weight % of the total amount of the aromatic amine-based antioxidants, which are used in combination.

9. The rubber composition according to claim 1, which is used as a molding material for grease cups.

10. A grease cup produced by vulcanization molding of the rubber composition according to claim 9.

11. The grease cup according to claim 10, which is used as a dust cover, a dust boot, or a bellows at a joint of a power transmission device.

12. The grease cup according to claim 10, which is bonded to a supporting body made of metal or resin.

13. The rubber composition according to claim 3, wherein the aromatic amine-based antioxidants are a combination of N-phenyl-N'-(1,3,-dimethylbutyl)-p-phenylenediamine and another aromatic amine.

14. The rubber composition according to claim 13, wherein the aromatic amine antioxidants are a combination of N-phenyl-N'-(1,3-dimethylbutyl)-p-phenylenediamine and 4,4'-bis($\alpha,\alpha$-dimethylbenzyl)diphenylamine.

15. The rubber composition according to claim 14, wherein 30-60 by weight % of the N-phenyl-N'-(1,3-dimethylbutyl)-p-phenylenediamine and 70-40 by weight % of the 4,4'-bis($\alpha,\alpha$-dimethylbenzyl)diphenylamine are used in 100 by weight % of the total amount of the aromatic amine-based antioxidants, which are used in combination.

16. The rubber composition according to claim 3, which is used as a molding material for grease cups.

17. A grease cup produced by vulcanization molding of the rubber composition according to claim 16.

18. The grease cup according to claim 17, which is used as a dust cover, a dust boot, or a bellows at a joint of a power transmission device.

19. The grease cup according to claim 17, which is bonded to a supporting body made of metal or resin.

* * * * *